(12) United States Patent
Mukainakano

(10) Patent No.: US 12,472,841 B2
(45) Date of Patent: Nov. 18, 2025

(54) IN-VEHICLE ELECTRIC POWER STORAGE SYSTEM, VEHICLE, AND RECORDING MEDIUM IN WHICH COMPUTER PROGRAM IS RECORDED

(71) Applicant: SUBARU CORPORATION, Tokyo (JP)

(72) Inventor: Yuya Mukainakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/685,366

(22) PCT Filed: Sep. 22, 2022

(86) PCT No.: PCT/JP2022/035364
§ 371 (c)(1),
(2) Date: Feb. 21, 2024

(87) PCT Pub. No.: WO2024/062593
PCT Pub. Date: Mar. 28, 2024

(65) Prior Publication Data
US 2025/0121734 A1 Apr. 17, 2025

(51) Int. Cl.
B60L 58/14 (2019.01)
B60L 50/60 (2019.01)
B60L 58/20 (2019.01)
H02J 9/04 (2006.01)

(52) U.S. Cl.
CPC .............. B60L 58/14 (2019.02); B60L 50/60 (2019.02); B60L 58/20 (2019.02); H02J 9/04 (2013.01); B60L 2240/547 (2013.01)

(58) Field of Classification Search
CPC .................................. B60L 58/14; B60L 58/15
See application file for complete search history.

(56) References Cited

U.S. PATENT DOCUMENTS

| | | | |
|---|---|---|---|
| 6,191,558 B1 * | 2/2001 | Arai | H02J 7/0013 320/132 |
| 6,331,365 B1 * | 12/2001 | King | B60L 50/51 320/126 |
| 2014/0055094 A1 | 2/2014 | Takagi et al. | |
| 2020/0235440 A1 * | 7/2020 | Hao | H01M 10/441 |

FOREIGN PATENT DOCUMENTS

| | | |
|---|---|---|
| JP | 2008-41620 A | 2/2008 |
| JP | 2012-234700 A | 11/2012 |
| JP | 2012-235610 A | 11/2012 |
| JP | 2017-093055 A | 5/2017 |
| JP | 2019-102226 A | 6/2019 |

OTHER PUBLICATIONS

Office Action dated May 13, 2025, issued in corresponding Japanese patent application No. 2024-548028, 8 pages.

* cited by examiner

Primary Examiner — Rexford N Barnie
Assistant Examiner — Esayas G Yeshaw
(74) Attorney, Agent, or Firm — Rimon P.C.

(57) ABSTRACT

In an in-vehicle electric power storage system including a high-capacity battery set and a high-output battery set coupled in parallel to each other, a battery control apparatus is configured to, when a voltage value of the high-capacity battery set reaches a lower-limit voltage or becomes close to the lower-limit voltage, decouple the high-capacity battery set from a circuit via a switch mechanism and continue outputting from the high-output battery set.

3 Claims, 4 Drawing Sheets

[FIG. 1]
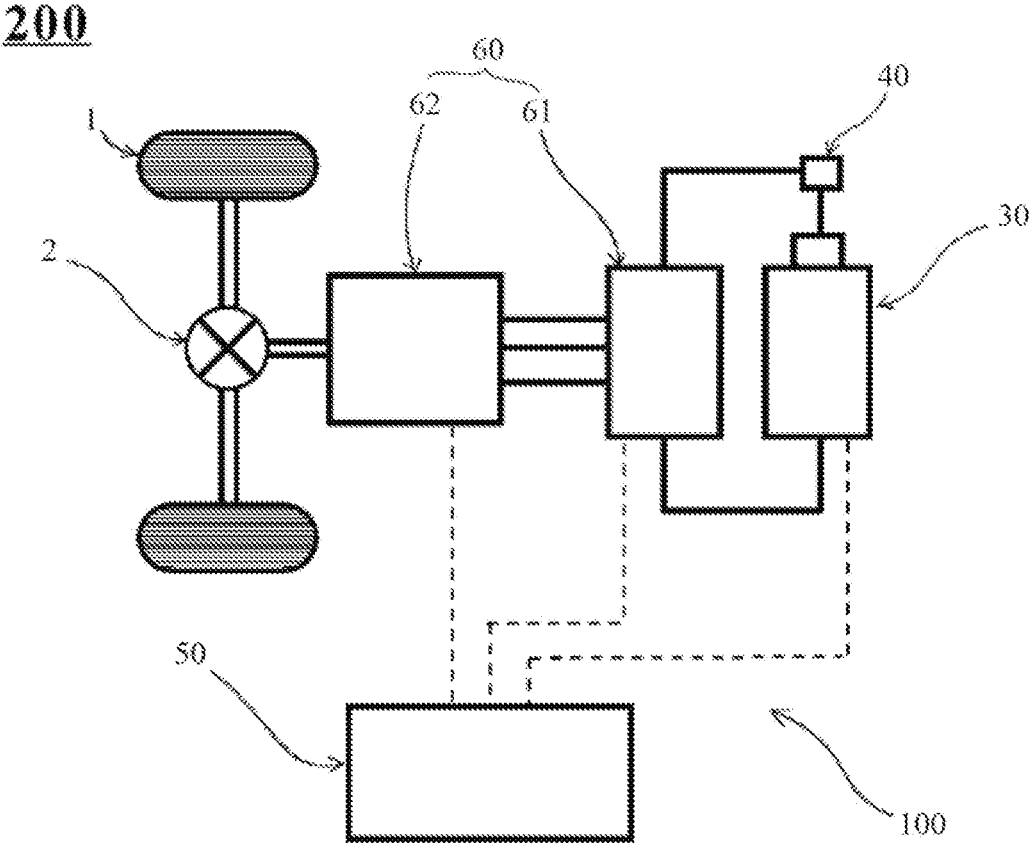

[ FIG. 2 ]
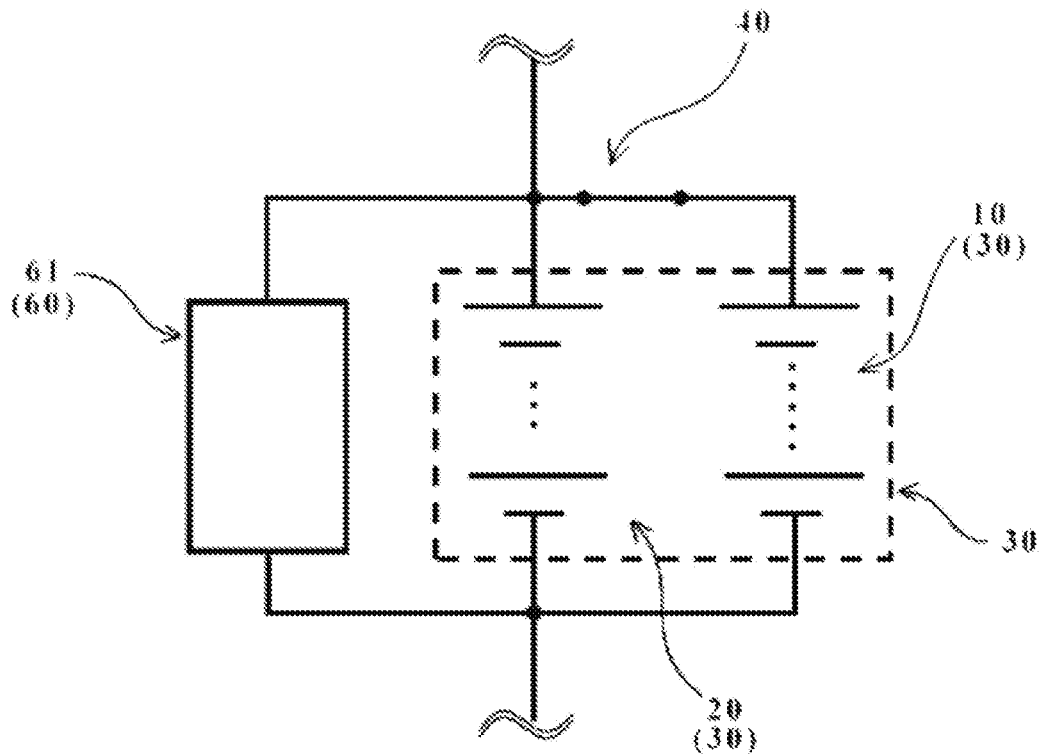
[ FIG. 3 ]
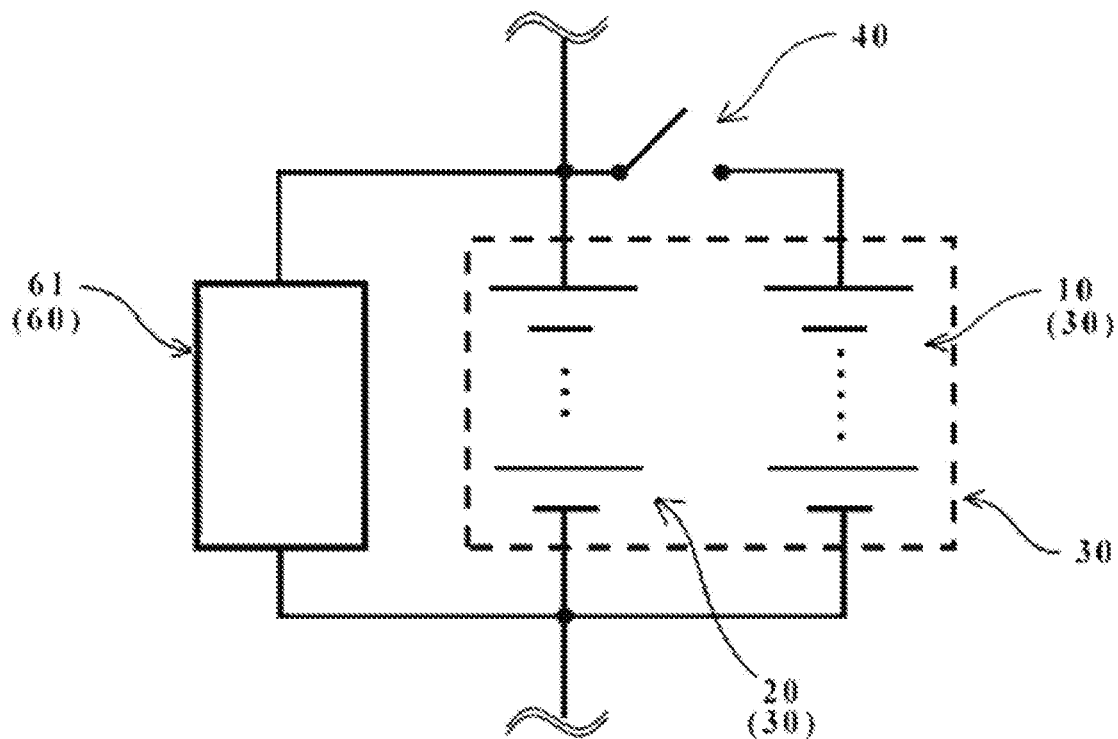

[FIG. 4]
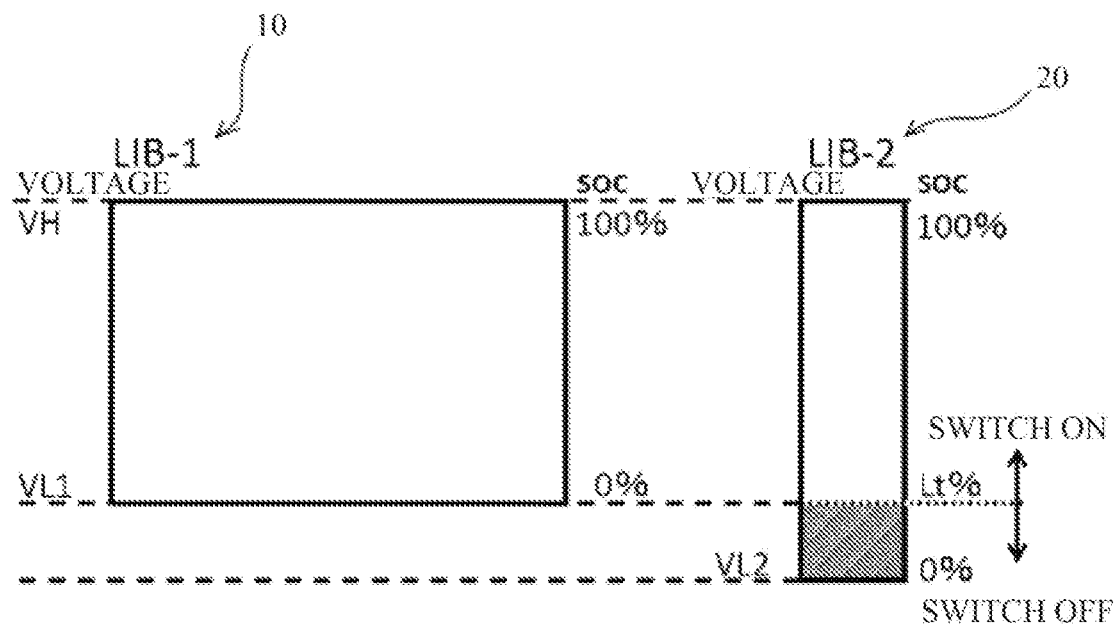
[FIG. 5]
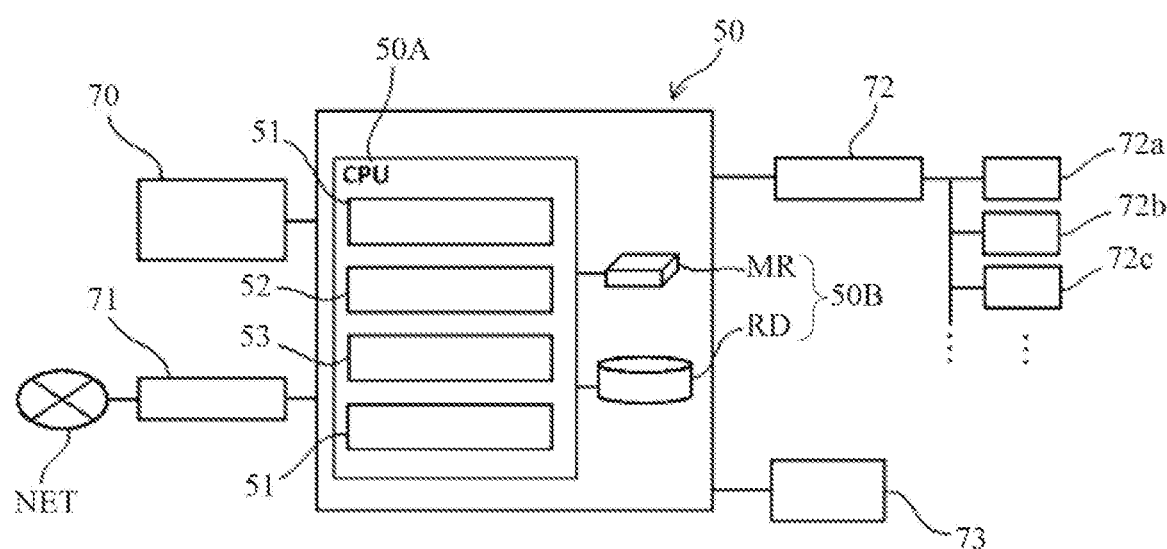

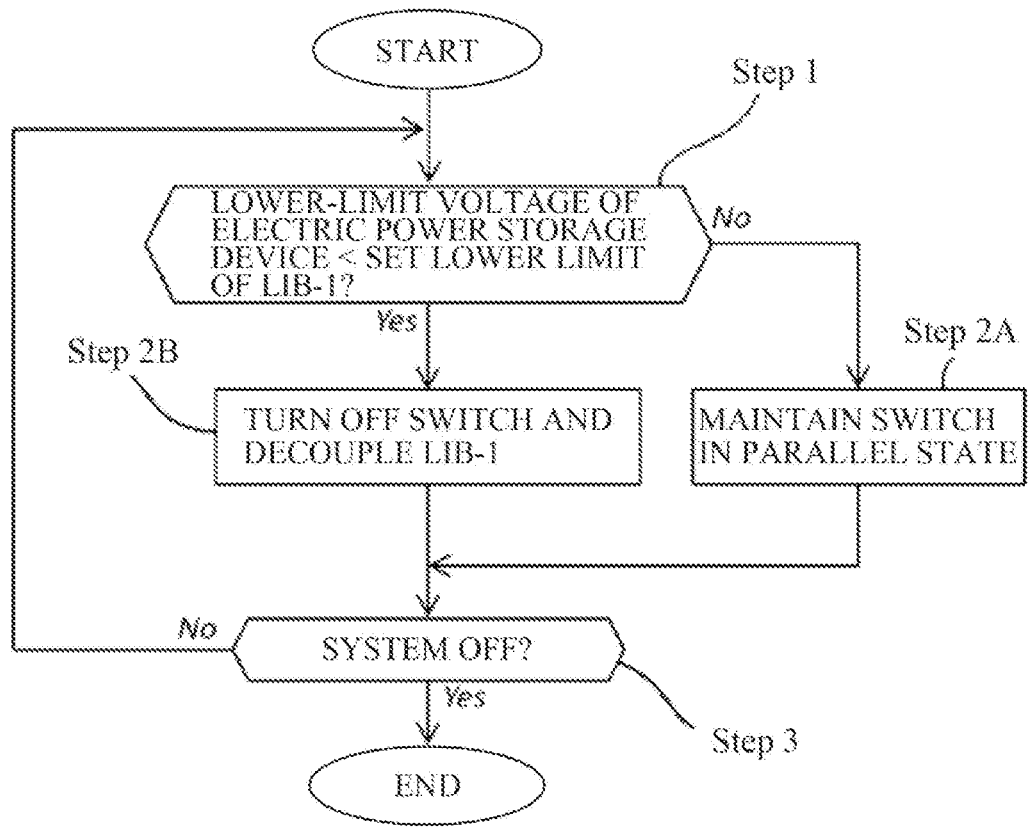

IN-VEHICLE ELECTRIC POWER STORAGE SYSTEM, VEHICLE, AND RECORDING MEDIUM IN WHICH COMPUTER PROGRAM IS RECORDED

CROSS-REFERENCE TO RELATED APPLICATIONS

This application is the U.S. National Phase under 35 U.S.C. § 371 of International Application No. PCT/JP2022/035364, filed on Sep. 22, 2022.

TECHNICAL FIELD

The disclosure relates to: an in-vehicle electric power storage system that is to be mounted in a vehicle and includes a relatively high-output non-aqueous secondary battery and a relatively high-capacity non-aqueous secondary battery coupled in parallel to each other; a vehicle mounted with the in-vehicle electric power storage system; a method of controlling the in-vehicle electric power storage system; etc.

BACKGROUND ART

As a chargeable and dischargeable electric power storage apparatus to be mounted in a vehicle, a non-aqueous electrolyte secondary battery (hereinafter, also simply referred to as a "non-aqueous secondary battery") is known. A lithium-ion secondary battery as one example of such a non-aqueous secondary battery is being developed for an in-vehicle use because the lithium-ion secondary battery is able to achieve an extremely high energy density. A battery for the in-vehicle use is required to be increased in both output and capacity at a high level to deal with various traveling situations.

For example, Patent Literature 1 proposes to mount, in a vehicle, a first assembled battery and a second assembled battery that are electrically coupled in parallel to each other and differ from each other in characteristic. Further, Patent Literature 2 discloses an electric power storage system and proposes: to provide a coupling means to cause a high-output battery to be coupled in parallel to a high-capacity battery as desired or to decouple the high-output battery from the high-capacity battery; and to couple the high-output battery in parallel to the high-capacity battery when an output current is required that is higher than or equal to a current suppliable by the high-capacity battery.

CITATION LIST

Patent Literature

Patent Literature 1: Japanese Unexamined Patent Application Publication No. 2019-102226
Patent Literature 1: Japanese Unexamined Patent Application Publication No. 2008-41620

SUMMARY OF INVENTION

Problem to be Solved by the Invention

However, existing techniques including the patent literatures described above still do not satisfy the market needs and still have the following problem. That is, an in-vehicle electric power storage system disclosed in Patent Literature 1 employs a configuration that performs switching to a high-capacity assembled battery when a high-output assembled battery is depleted. With such a configuration, for example, when switching is performed from the high-output assembled battery to the high-capacity assembled battery while a vehicle is traveling, an output of a battery serving as an electric power storage device can suddenly decrease. This can affect a vehicle control or ride comfort. Meanwhile, the in-vehicle electric power storage system disclosed in Patent Literature 2 basically couples the high-output battery in parallel to the high-capacity battery only when a high output current is required. Therefore, when the high-output battery is not coupled in parallel to the high capacity battery, such a system is just increased in vehicle weight. This is far from an efficient system.

In view of, for example, the above-described problem, the disclosure is to provide: an in-vehicle electric power storage system that allows a relatively high-output secondary battery and a relatively high-capacity secondary battery to be coupled in parallel to each other and makes it possible to perform stable battery outputting; a vehicle including the in-vehicle electric power storage system; a method of controlling the in-vehicle electric power storage system; a computer program; and a recording medium in which the computer program is recorded.

Means for Solving the Problem

To solve the above-described problem, provided according to an aspect of the disclosure is an in-vehicle electric power storage system including a high-capacity battery set, a high-output battery set, a switch mechanism, and a battery control apparatus. The high-capacity battery set has a higher capacity than the high-output battery set. The high-output battery set is coupled in parallel to the high-capacity battery set and has a higher output than the high-capacity battery set. The switch mechanism is configured to decouple the high-capacity battery set from a circuit including the high-output battery set. The battery control apparatus is configured to control the switch mechanism. The high-output battery set has a lower-limit voltage set lower than a lower-limit voltage of the high-capacity battery set. The battery control apparatus is configured to, when a voltage value of the high-capacity battery set reaches the lower-limit voltage or becomes close to the lower-limit voltage, decouple the high-capacity battery set from the circuit via the switch mechanism and continues outputting from the high-output battery set.

To solve the above-described problem, provided according to another aspect of the disclosure is a vehicle including the in-vehicle electric power storage system according to the disclosure.

Further, to solve the above-described problem, provided according to still another aspect of the disclosure is a recording medium in which a computer program is recorded. The computer program is to be applied to an in-vehicle electric power storage system including a high-capacity battery set and a high-output battery set coupled in parallel to each other. The in-vehicle electric power storage system is to be mounted in a vehicle. The computer program causes one or more processors to execute a process including: acquiring voltage value information related to an electric power storage device; and performing a control to decouple the high-capacity battery set from a circuit via a switch mechanism and to continue outputting from the high-output battery set, when a voltage value of the high-capacity battery set reaches a lower-limit voltage or becomes close to the lower-limit voltage.

Effects of the Invention

According to the disclosure, it is possible to allow a relatively high-output non-aqueous secondary battery and a relatively high-capacity non-aqueous secondary battery to be coupled in parallel to each other and to perform stable battery outputting.

BRIEF DESCRIPTION OF DRAWINGS

FIG. 1 is a schematic diagram illustrating a configuration example of a vehicle including an in-vehicle electric power storage system according to the disclosure.

FIG. 2 is a schematic diagram illustrating a first coupling pattern (a parallel coupling state) with respect to a load of an electric power storage device according to one embodiment of the disclosure.

FIG. 3 is a schematic diagram illustrating a second coupling pattern (a state in which decoupling is performed from parallel coupling) with respect to the load of the electric power storage device according to one embodiment of the disclosure.

FIG. 4 is a schematic diagram comparing a high-capacity battery set and a high-output battery set included in the electric power storage device in terms of capacity and outputtable voltage.

FIG. 5 is a functional block diagram of a vehicle including a control apparatus according to one embodiment of the disclosure.

FIG. 6 is a flowchart illustrating a method of controlling the in-vehicle electric power storage system to be executed by the control apparatus according to one embodiment of the disclosure.

MODES FOR CARRYING OUT THE INVENTION

In the following, some preferred embodiments of the disclosure are described in detail with reference to the accompanying drawings. Note that throughout the present description and the drawings, elements having substantially the same function are denoted with the same reference numerals to avoid any redundant description. In addition, for example, publicly known techniques and publicly known vehicle configurations including the patent literatures described above may be appropriately applied and implemented for a configuration other than the configuration to be described below in detail.

<1-1. In-Vehicle Electric Power Storage System>

Referring to FIGS. 1 to 5, a description is provided of a configuration example of an in-vehicle electric power storage system 100 and a vehicle 200 according to an embodiment of the disclosure. FIG. 1 is a schematic diagram illustrating the vehicle 200 mounted with the in-vehicle electric power storage system 100. Note that in the following, an electric automobile (BEV) mounted with an electric motor is described as an example of the "vehicle"; however, the vehicle of the embodiment may be a hybrid electric automobile (HEV) that also uses a publicly known engine (internal combustion engine) together, or may be an electric vehicle including another publicly known electric power generator such as a gas turbine.

As illustrated in FIG. 1, the vehicle 200 of the embodiment is mounted with a load 60. The load 60 supplies driving force to a wheel 1 via a publicly known power transmission mechanism 2. The wheel 1 serves as a driving wheel. The power transmission mechanism 2 includes a differential gear. In the following, described as an example is a front-wheel-drive (FWD) vehicle in which driving force is supplied from the load 60 to front wheels of the wheels 1; however, the embodiment is not limited to this example, and it may be a rear-wheel-drive (RWD) vehicle in which the above-described driving force is supplied to rear wheels, or may be an all-wheel-drive (AWD) vehicle in which the driving force is supplied to all the wheels. Further, other than the above, the vehicle 200 of the disclosure may be, for example, an in-wheel motor electric automobile in which an electric motor is mounted individually for each of the wheels 1.

The load 60 includes a publicly known inverter 61 and a publicly known electric motor 62. The inverter 61 receives electric power supply from an electric power storage device 30 to be described later. The electric motor 62 is coupled to the inverter 61, and supplies driving force to the wheel 1 described above. Note that as illustrated in FIG. 1, the load 60 of the embodiment is electrically coupled to the electric power storage device 30 via a switch mechanism 40. The electric power storage device 30 serves as an in-vehicle electric power source. The switch mechanism 40 is configured to switch a coupling pattern.

The electric power storage device 30 includes a high-capacity battery set 10 and a high-output battery set 20. The high-capacity battery set 10 has a higher capacity than another battery set. The high-output battery set 20 is coupled in parallel to the high-capacity battery set 10, and has a higher output than the high-capacity battery set 10. Note that in the following, two sets of non-aqueous secondary batteries (lithium-ion secondary batteries) differing from each other in characteristic are described as an example of battery sets of the embodiment; however, a publicly known secondary battery other than the non-aqueous secondary battery may be included. For example, one may be a lithium-ion secondary battery set and another may be a nickel-hydrogen battery set.

For example, the high-capacity battery set 10 may include one lithium-ion secondary battery LiB-1 or multiple lithium-ion secondary batteries LiB-1 coupled in series to each other. A lithium-ion secondary battery LiB-1 suitable for such a high-capacity battery set 10 is, for example: a publicly known lithium-ion secondary battery that uses a carbon-based material in a negative electrode; or a publicly known high-capacity lithium-ion secondary battery that uses lithium iron phosphate in a positive electrode.

As a non-limiting example, the lithium-ion secondary battery LiB-1 of the embodiment uses lithium iron phosphate or a ternary system positive electrode (nickel, cobalt, and lithium manganate) as a positive electrode material, and uses a publicly known carbon-based material as a negative electrode material.

Meanwhile, for example, the high-output battery set 20 may include one lithium-ion secondary battery LiB-2 or multiple lithium-ion secondary batteries LiB-2 coupled in series to each other. The one lithium-ion secondary battery LiB-2 or the multiple lithium-ion secondary batteries LiB-2 coupled in series to each other differ from the above-described high-capacity battery set 10 in characteristic. A lithium-ion secondary battery LiB-2 suitable for such a high-output battery set 20 is, for example, a publicly known high-output lithium-ion secondary battery that uses lithium titanate in a negative electrode.

Similarly, as a non-limiting example, the lithium-ion secondary battery LiB-2 of the embodiment uses lithium manganate as a positive electrode material, and uses lithium titanate as a negative electrode material.

As can be understood from FIGS. 2 and 3, in the electric power storage device 30 of the embodiment, the high-capacity battery set 10 and the high-output battery set 20 described above are coupled to an electric circuit coupled to the load 60 via the switch mechanism 40. That is, as illustrated in FIG. 2, firstly, the switch mechanism 40 of the embodiment is configured to have a function of coupling the high-capacity battery set 10 and the high-output battery set 20 in parallel to the load 60. Such a pattern in which the high-capacity battery set 10 and the high-output battery set 20 are coupled in parallel to the load 60 is also referred to as a "first coupling pattern".

Further, as illustrated in FIG. 3, secondly, the switch mechanism 40 of the embodiment is configured to have a function of decoupling the high-capacity battery set 10 from the load 60 and coupling the high-output battery set 20 to the load 60. Such a pattern in which the high-output battery set 20 is coupled to the load 60 while the high-capacity battery set 10 is decoupled from the load 60 is also referred to as a "second coupling pattern". In such a manner, the switch mechanism 40 of the embodiment is configured to switch a coupling state of the electric power storage device 30 with respect to the load 60 to any of the first coupling pattern and the second coupling pattern described above.

In other words, the switch mechanism 40 of the embodiment has a function of decoupling the above-described high-capacity battery set 10 from the circuit including the high-output battery set 20 at a predetermined timing. Note that a specific example of the switch mechanism 40 is not particularly limited. As long as the switch mechanism 40 exhibits the above-described functions, a publicly known switch such as a semiconductor switch or a mechanical switch may be employed.

<1-2. Detailed Configuration of Electric Power Storage Device>

Next, a description is provided of a detailed configuration of the electric power storage device 30 of the embodiment with reference to FIGS. 2 to 4.

As can be understood from FIG. 4, in the electric power storage device 30 of the embodiment, the high-output battery set has a lower-limit voltage VL2 set lower than a lower-limit voltage VL1 of the high-capacity battery set 10. For example, in the embodiment, the lower-limit voltage VL1 of the high-capacity battery set 10 may be set to 190 V, and the lower-limit voltage VL2 of the high-output battery set 20 may be set to 170 V.

Accordingly, as illustrated in FIG. 4, a capacity from 170 V (the lower-limit voltage VL2) to 190 V of the high-output battery set 20 is to be electric power supplied to the load 60 in the above-described second coupling pattern. As will be described later, in the embodiment, when electric power is supplied from the electric power storage device 30 to the load 60, the first coupling pattern is used as a reference. The capacity from 170 V (the lower-limit voltage VL2) to 190 V of the high-output battery set 20 is thus also referred to as a "non-normal capacity" in the embodiment.

Meanwhile, the high-output battery set 20 has an upper-limit voltage set to be substantially equal to an upper-limit voltage of the high-capacity battery set 10. Accordingly, an upper-limit voltage VH of the electric power storage device 30 corresponds to the upper-limit voltage of the high-capacity battery set 10 and the upper-limit voltage of the high-output battery set 20. As an example, in the embodiment, the upper-limit voltage VH of the electric power storage device 30 may be set to 300 V.

In addition, in the embodiment, a weight energy density ratio between the high-capacity lithium-ion secondary battery LiB-1 to be used and the high-output lithium-ion secondary battery LiB-2 to be used is set to 3:1. Accordingly, when the electric power storage device 30 is configured to have the upper-limit voltages and the lower-limit voltages described above, a capacity ratio is as illustrated in FIG. 4. Note that although the weight energy density ratio between the lithium-ion secondary battery LiB-1 and the lithium-ion secondary battery LiB-2 is set to 3:1, the weight energy density ratio is not limited thereto, and may be set to another ratio depending on the use of the vehicle, etc.

As described above, in the embodiment, it is assumed that the high-capacity battery set 10 and the high-output battery set 20 are coupled in parallel to each other. Therefore, in the electric power storage device 30 of the embodiment, while the high-capacity battery set 10 and the high-output battery set 20 are coupled in parallel to each other, cells (single batteries) in the high-capacity battery set 10 are coupled in series to each other and cells (single batteries) in the high-output battery set 20 are coupled in series to each other to allow a voltage across the high-capacity battery set 10 and a voltage across the high-output battery set 20 to be equal to each other. The number of cells (single batteries) in the high-capacity battery set 10 and the number of cells (single batteries) in the high-output battery set 20 are different from each other.

For example, when the upper-limit voltage in the specification of the high-capacity lithium-ion secondary battery LiB-1 used in the embodiment is 4.2 V, it is able to be set to 300 V described above by coupling 71 single batteries in series in total (4.2 V×71 pieces=298.2 V). Meanwhile, when the upper-limit voltage in the specification of the high-output lithium-ion secondary battery LiB-2 used in the embodiment is 2.7 V, it is able to substantially match the upper-limit voltage of the high-capacity battery set 10 by coupling 111 single batteries in series in total (2.7 V×111 pieces=299.7 V).

<1-3. Detailed Configuration of Battery Control Apparatus>

Referring again to FIG. 1, the in-vehicle electric power storage system 100 of the embodiment includes a battery control apparatus 50. The battery control apparatus 50 controls the switch mechanism 40 described above. In addition, the battery control apparatus 50 may be configured to have a function of monitoring a state of charge (SOC) of the electric power storage device 30 described above, a function of controlling charging and discharging of the electric power storage device 30 described above, etc.

Such a battery control apparatus 50 is also referred to as a BMU (battery management unit). For example, the battery control apparatus 50 includes one or more processors and one or more memories communicably coupled to the one or more processors. The one or more processors each include, for example, a CPU (Central Processing Unit). The one or more memories each include, for example, a RAM (Random Access Memory) or a ROM (Read Only Memory).

As described above, the battery control apparatus 50 serves as an apparatus that controls charging and discharging of the high-capacity battery set 10 and the high-output battery set 20 via the switch mechanism 40 by the one or more processors executing a computer program. The computer program is a computer program for causing the one or more processors to execute the later-described operation to be executed by the battery control apparatus 50. The computer program to be executed by the one or more processors may be recorded in a recording medium serving as a storage (a memory) included in the battery control apparatus 50. The computer program to be executed by the one or more processors may be recorded in a recording medium built in the battery control apparatus 50 or any external recording medium attachable to the battery control apparatus 50.

Note that the recording medium in which the computer program is recorded may be: a magnetic medium such as a hard disk, a floppy disk, or a magnetic tape; an optical recording medium such as a CD-ROM (Compact Disk Read Only Memory), a DVD (Digital Versatile Disk), or a Blu-ray (registered trademark); a magnetooptical medium such as a floptical disk; a storage device such as a RAM or a ROM; a flash memory such as a USB (Universal Serial Bus) memory; an SSD (Solid State Drive), or any other medium that is able to hold the program.

More specifically, the battery control apparatus 50 in the embodiment includes a processing unit 50A and a storage unit 50B.

The processing unit 50A includes one or more processors each including a CPU or the like described above. The processing unit 50A includes a battery state-value acquisition unit 51, an SOC monitoring unit 52, a switch control unit 53, and a display control unit 54. Each of the units included in the processing unit 50A is a function to be implemented by the above-described one or more processors executing a program. However, the battery state-value acquisition unit 51, the SOC monitoring unit 52, the switch control unit 53, and the display control unit 54 described above may partially be configured by a publicly known analog circuit.

The processing unit 50A may be configured to be communicable with a vehicle driving control apparatus 70. The vehicle driving control apparatus 70 includes another publicly known ECU to be mounted in a vehicle. Note that the vehicle driving control apparatus 70 may have a function of controlling driving of the battery control apparatus 50 of the embodiment, for example, based on detected values of publicly known vehicle-state sensors including a vehicle speed sensor, an acceleration sensor, an angular velocity sensor, a steering angle sensor, an accelerator pedal sensor, and a brake pedal sensor.

In addition, the processing unit 50A may be configured to communicate information with a publicly known external network NET via a publicly known in-vehicle communication apparatus 71. The publicly known external network NET is, for example, the Internet.

The storage unit 50B may include a publicly known memory MR and a recording device RD. The publicly known memory MR temporarily holds information, and is, for example, a RAM. The recording device RD is, for example, a publicly known hard disk HDD or SSD in which a program or the like is storable. The storage unit 50B of the embodiment may hold a program to be executed by the processing unit 50A and various parameters to be used in execution of the program, and may also hold acquired data, calculation result data, etc.

In the following, a description is provided of each of the battery state-value acquisition unit 51, the SOC monitoring unit 52, the switch control unit 53, and the display control unit 54 in the processing unit 50A.

(Battery State-Value Acquisition Unit)

The battery state-value acquisition unit 51 executes a process of acquiring a state value (specifically, information regarding a current value and a voltage value) in the electric power storage device 30 mounted in the vehicle 200. Specifically, the battery state-value acquisition unit 51 has a function of detecting the state value (the voltage value and the current value) of the electric power storage device 30 in the vehicle 200 that is traveling or stopped, via a publicly known current sensor 72a and a publicly known voltage sensor 72b provided in the electric power storage device 30.

(SOC Monitoring Unit)

The SOC monitoring unit 52 executes a process of detecting and monitoring an SOC (state of charge) of each of the high-capacity battery set 10 and the high-output battery set 20 of the electric power storage device 30 mounted in the vehicle 200 via the current sensor 72a and the voltage sensor 72b mounted in the vehicle. Note that a specific method of detecting the SOC by the SOC monitoring unit 52 is not particularly limited as long as not departing from the gist of the embodiment. For example, any of various publicly known SOC estimation techniques including, without limitation, a technique disclosed in Japanese Unexamined Patent Application Publication No. 2021-68637 and a technique disclosed in International Publication No. WO2019/193471 may be used.

(Switch Control Unit)

The switch control unit 53 executes a process of switching the above-described coupling state of the electric power storage device 30 with respect to the above-described load 60. For example, the switch control unit 53 may execute a process of performing switching between the first coupling pattern illustrated in FIG. 2 as an example and the second coupling pattern illustrated in FIG. 3 as an example via the above-described switch mechanism 40.

(Display Control Unit)

The display control unit 54 executes a process of displaying various kinds of information on a display apparatus 73. The various kinds of information include the coupling state of the electric power storage device 30 with respect to the load 60. Here, examples of the display apparatus 73 of the embodiment may include, for example, a publicly known in-vehicle display. Note that the display control unit 54 may perform audio presentation of the above-described various kinds of information by means of an in-vehicle speaker. Alternatively, the display control unit 54 may display the above-described various kinds of information on an external terminal such as an occupant's smartphone.

Note that the computer program to implement each of the functions of the processing unit 50A described above is, for example, a computer program to be applied to an in-vehicle electric power supply system, for a vehicle, that includes a high-capacity battery set and a high-output battery set. The high-capacity battery set includes one or more non-aqueous secondary batteries (lithium-ion secondary batteries). The high-output battery set is coupled in parallel to the high-capacity battery set, and has a lower-limit voltage set lower than a lower-limit voltage of the high-capacity battery set. The computer program causes one or more processors to acquire voltage value information related to the electric power storage device 30, and to execute a control to decouple the high-capacity battery set 10 from the circuit via the switch mechanism 40 and to continue outputting from the high-output battery set 20, when the voltage value of the high-capacity battery set reaches the lower-limit voltage or becomes close to the lower limit. In addition, such a computer program may be, for example, in a form stored in the above-described publicly known recording medium, or may be in a form to be downloaded to the vehicle 200 from a publicly known server such as a cloud.

<1-4. Other In-Vehicle Equipment>

The vehicle 200 of the embodiment may further include the vehicle driving control apparatus 70. The vehicle driving control apparatus 70 cooperates with the above-described battery control apparatus 50 to control the load 60, the above-described electric power generator, or the like.

Such a vehicle driving control apparatus 70 is configured to have a function of controlling driving of the vehicle 200, for example, based on state information related to the vehicle 200. The state information related to the vehicle 200 is detected, for example, by sensors 72 mounted in the vehicle 200. For example, the vehicle driving control apparatus 70 includes one or more processors and one or more memories communicably coupled to the one or more processors. The one or more processors each include, for example, a CPU (Central Processing Unit). The one or more memories each include, for example, a RAM (Random Access Memory) or a ROM (Read Only Memory).

Such vehicle state sensors are each an apparatus that measures information indicating a behavior and an operation state of the vehicle 200. For example, the vehicle state sensors may belong to the sensors 72 of the embodiment, and may each include one or more of a publicly known vehicle speed sensor, a publicly known acceleration sensor, and a publicly known angular velocity sensor. In addition, the vehicle state sensor may each include a publicly known steering angle sensor, a publicly known accelerator pedal sensor, and a publicly known brake pedal sensor.

In addition, the vehicle driving control apparatus 70 may be configured to have a function of controlling the driving of the vehicle 200 based on position information detected by a vehicle position information sensor 72c mounted in the vehicle 200. Such a vehicle position information sensor 72c may be, for example, a publicly known GPS (Global Positioning System) sensor. Note that although the GPS sensor is used as the vehicle position information sensor 72c in the embodiment, this example is non-limiting. Equipment may be provided that receives a satellite signal from another satellite system that identifies a position of the vehicle 200.

<2-1 Method of Controlling In-Vehicle Electric Power Storage System>

Next, a specific description is provided of a method of controlling the in-vehicle electric power storage system 100 including the electric power storage device 30 of the embodiment, also with reference to FIG. 6. Note that the above-described controlling method may be used as an algorithm of the program described above. A program having such an algorithm may be distributed, for example, in a form downloadable via a publicly known network, or in a form stored in a recording medium.

In the following, the description is provided based on the assumption that, for example, a user has got in the vehicle 200, has started a system electric power supply, and has caused the vehicle 200 to start traveling.

First, in Step 1, the battery control apparatus 50 detects whether the lower-limit voltage of the electric power storage device 30 is lower than the set lower limit of the high-capacity battery set 10 (190 V in this example, as described above). More specifically, the battery control apparatus 50 monitors the voltage value of the high-capacity battery set 10 in the vehicle 200 that is traveling or stopped via the above-described voltage sensor 72b. Note that although the battery control apparatus 50 monitors the voltage value of the high-capacity battery set 10 in this example, this example is non-limiting. For example, in one example, the voltage value of the high-output battery set 20 or of the electric power storage device 30 as a whole may be monitored.

Further, if the lower-limit voltage of the electric power storage device 30 is not lower than the set lower limit of the high-capacity battery set 10 in Step 1 (No in Step 1), the process proceeds to Step 2A. In Step 2A, the battery control apparatus 50 executes a control of supplying electric power to the load 60 in the above-described first coupling pattern via the switch mechanism 40. Thus, before the voltage value of the high-capacity battery set 10 reaches the lower-limit voltage or becomes close to the lower limit, electric power is supplied from both the high-capacity battery set 10 and the high-output battery set 20.

In contrast, if the lower-limit voltage of the electric power storage device 30 is lower than the set lower limit of the high-capacity battery set 10 in Step 1 (Yes in Step 1), the process proceeds to Step 2B. In Step 2B, the battery control apparatus 50 executes a control of supplying electric power to the load 60 in the above-described second coupling pattern via the switch mechanism 40.

That is, when the voltage value of the high-capacity battery set 10 reaches the lower-limit voltage or becomes close to the lower limit, the battery control apparatus 50 executes a control of decoupling the high-capacity battery set 10 from the circuit and continuing the outputting from the high-output battery set 20.

Note that a timing to decouple the high-capacity battery set 10 from the circuit via the switch mechanism 40 does not have to be a moment when the above-described voltage value reaches the lower-limit voltage. The high-capacity battery set 10 may be decoupled from the circuit at a timing slightly earlier than such a moment. This makes it possible to further suppress degradation of the lithium-ion secondary battery LiB-1 of the high-capacity battery set 10.

In this case, in the embodiment, the lower-limit voltage of the high-output battery set 20 coupled in parallel is set lower than the lower-limit voltage of the high-capacity battery set 10. Therefore, basically, switching to the high-output battery set 20 due to prior depletion of the SOC of the high-capacity battery set 10 makes it possible to improve ride comfort while relatively reducing a decrease in output and stabilizing a vehicle control as compared with an existing example.

As described above, the vehicle 200 including the in-vehicle electric power storage system 100 according to the embodiment of the disclosure uses a combination of two electric power storage devices (the high-capacity battery set 10 and the high-output battery set 20) different from each other in lower-limit voltage. In addition, the high-capacity battery set 10 and the high-output battery set 20 form the electric circuit coupled in parallel to the load 60 of the vehicle via the switch mechanism 40. In this case, the battery control apparatus 50 executes a control of decoupling the high-capacity electric power storage device (i.e., the high-capacity battery set 10) having a higher lower-limit voltage of the two electric power storage devices when the SOC is depleted.

Thus, according to the in-vehicle electric power storage system 100 and the vehicle 200 of the embodiment, it is possible to allow a relatively high-output non-aqueous secondary battery and a relatively high-capacity non-aqueous secondary battery are coupled in parallel to each other and to perform stable battery outputting.

Although preferred embodiments of the disclosure have been described in detail in the foregoing with reference to the accompanying drawings, the technique of the disclosure is by no means limited to such examples. It is obvious that various modifications and alterations may be made by persons having ordinary knowledge in the technical field of the disclosure within the scope of the technical idea as defined by the claims. Such modifications and alternations should obviously be understood as belonging to the technical scope of the disclosure.

For example, in the embodiment described above, the battery control apparatus 50 executes the control of decoupling the high-capacity battery set (the high-capacity battery set 10) from the circuit in Step 2B. However, the disclosure is not limited to the above-described embodiment. Charging may be executed giving priority to the high-capacity battery set 10 upon charging the electric power storage device 30 by appropriately controlling the switch mechanism 40 upon later regeneration.

In addition, in the above-described embodiment, one high-capacity battery set 10 and one high-output battery set 20 are included in the electric power storage device 30. However, for example, a configuration may be employed in which multiple high-capacity battery sets 10, multiple high-output battery sets 20, or multiple high-capacity battery sets 10 and multiple high-output battery sets 20 are provided to couple more battery sets in parallel.

In addition, when the voltage value of the high-capacity battery set 10 becomes lower than or equal to the set lower-limit value, a control of the switch mechanism 40 may be performed based on an assumption of an example at the time when the electric power storage device 30 is charged, as will be described below.

That is, in a case where the voltage value of the high-capacity battery set 10 becomes lower than or equal to the set lower-limit value and where the switch mechanism 40 maintains the above-described first coupling pattern, the battery control apparatus 50 may execute a charging process until the high-capacity battery set 10 is fully charged although a charging current value (an input rate) is limited to that of the high-capacity battery set 10 and a charging time becomes longer.

Meanwhile, in a case where the voltage value of the high-capacity battery set 10 becomes lower than or equal to the set lower-limit value and where the switch mechanism 40 maintains the above-described second coupling pattern, the battery control apparatus 50 is able to charge only the high-output battery set 20, and may therefore execute a quick charging process on the high-output battery set 20. This makes it possible to efficiently charge the electric power storage device 30, for example, when a long range is not necessary but the electric power storage device 30 is desirably charged as quickly as possible.

DESCRIPTION OF REFERENCE NUMERALS

1: wheel, 2: power transmission mechanism, 10: high-capacity battery set, 20: high-output battery set, 30: electric power storage device, 40: switch mechanism, 50: battery control apparatus, 60: load, 70: vehicle control apparatus, 71: communication apparatus, 72: sensors, 73: display apparatus, 100: in-vehicle electric power storage system, 200: vehicle

The invention claimed is:

1. An in-vehicle electric power storage system comprising:
 a high-capacity battery set that has a higher capacity than a high-output battery set;
 the high-output battery set that is coupled in parallel to the high-capacity battery set and has a higher output than the high-capacity battery set;
 a switch mechanism configured to decouple the high-capacity battery set from a circuit including the high-output battery set; and
 a battery control apparatus configured to control the switch mechanism,
 wherein cells in the high-capacity battery set are coupled in series to each other and cells in the high-output battery set are coupled in series to each other to allow a voltage across the high-capacity battery set and a voltage across the high-output battery set to be equal to each other, the high-capacity battery set and the high-output battery set being coupled in parallel to each other, the cells in the high-capacity battery set and the cells in the high-output battery set being different in number from each other,
 wherein the high-output battery set has a lower-limit voltage set lower than a lower-limit voltage of the high-capacity battery set,
 wherein the battery control apparatus is configured to, without supplying electric power only from the high capacity battery set, before the voltage value of the high capacity battery set becomes the lower limit voltage or becomes close to the lower limit voltage from a value greater than the lower limit voltage, supply electric power from both the high capacity battery set and the high output battery set,
 wherein the battery control apparatus is further configured to, when a voltage value of the high-capacity battery set becomes the lower-limit voltage or becomes close to the lower-limit voltage from a value greater than the lower-limit voltage, decouple the high-capacity battery set from the circuit via the switch mechanism and continue outputting from the high-output battery set, and
 wherein the number of cells in the high-capacity battery set and the number of cells in the high-output battery set are set to be different such that a terminal voltage of the high-capacity battery set at a state of charge (SOC) of 100% is equal to a terminal voltage of the high-output battery set at a SOC of 100%.

2. A vehicle comprising the in-vehicle electric power storage system according to claim 1.

3. A recording medium in which a computer program is recorded, the computer program being to be applied to an in-vehicle electric power storage system including a high-capacity battery set and a high-output battery set coupled in parallel to each other,
 wherein cells in the high-capacity battery set are coupled in series to each other and cells in the high-output battery set are coupled in series to each other to allow a voltage across the high-capacity battery set and a voltage across the high-output battery set to be equal to each other, the high-capacity battery set and the high-output battery set being coupled in parallel to each other, the cells in the high-capacity battery set and the cells in the high-output battery set being different in number from each other,
 wherein the number of cells in the high-capacity battery set and the number of cells in the high-output battery set are set to be different such that a terminal voltage of the high-capacity battery set at a state of charge (SOC) of 100% is equal to a terminal voltage of the high-output battery set at a SOC of 100%,
 wherein the in-vehicle electric power storage system is to be mounted in a vehicle, and wherein the computer program causes one or more processors to execute a process comprising:
acquiring voltage value information related to an electric power storage device; and
performing a control to decouple the high-capacity battery set from a circuit via a switch mechanism and to continue outputting from the high-output battery set, when a voltage value of the high-capacity battery set reaches a lower-limit voltage or becomes close to the lower-limit voltage; and
performing a control to supply electric power from both the high-capacity battery set and the high-output battery set, before the voltage value of the high-capacity battery set reaches the lower-limit voltage or becomes close to the lower-limit voltage, without supplying electric power only from the high-capacity battery set.

* * * * *